May 12, 1931. H. T. CLARKE ET AL 1,804,745
PROCESS OF REMOVING WATER FROM AQUEOUS ACETIC ACID
Filed Nov. 12, 1927 3 Sheets-Sheet 1
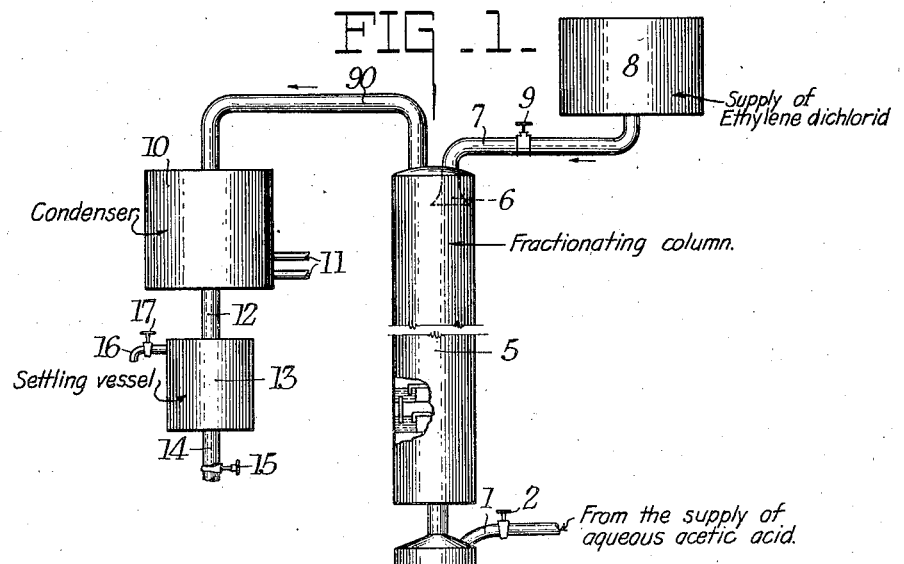
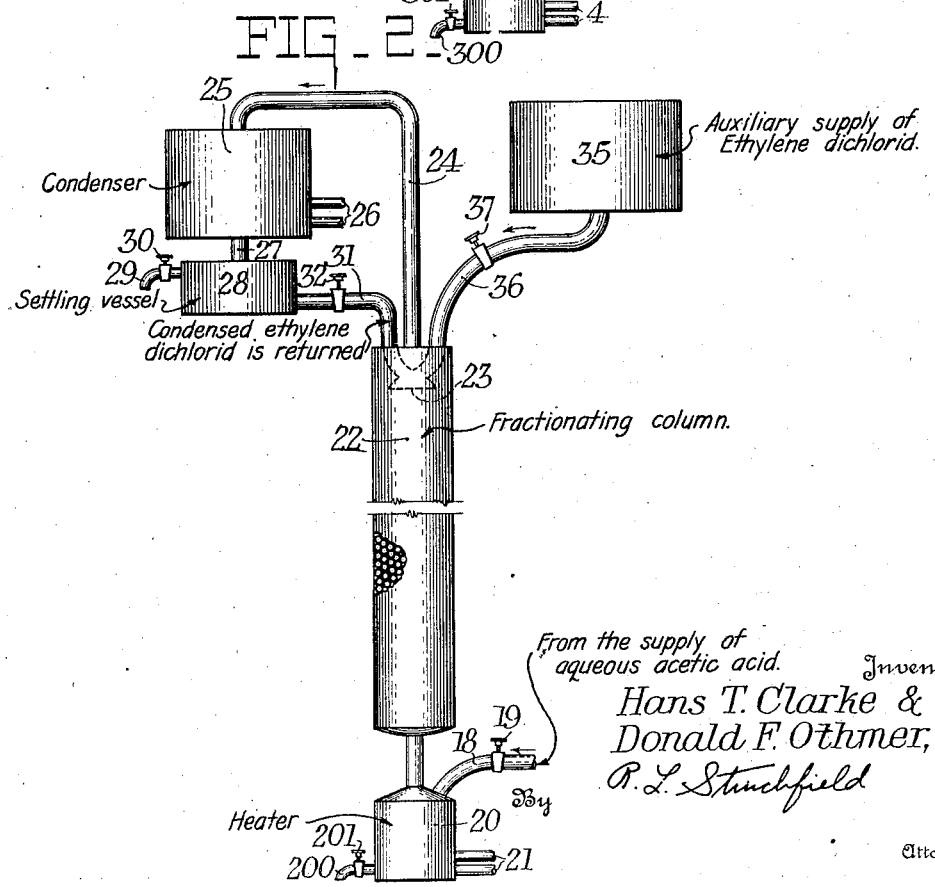
Inventors;
Hans T. Clarke &
Donald F. Othmer,
R. L. Stuchfield
By
Attorney

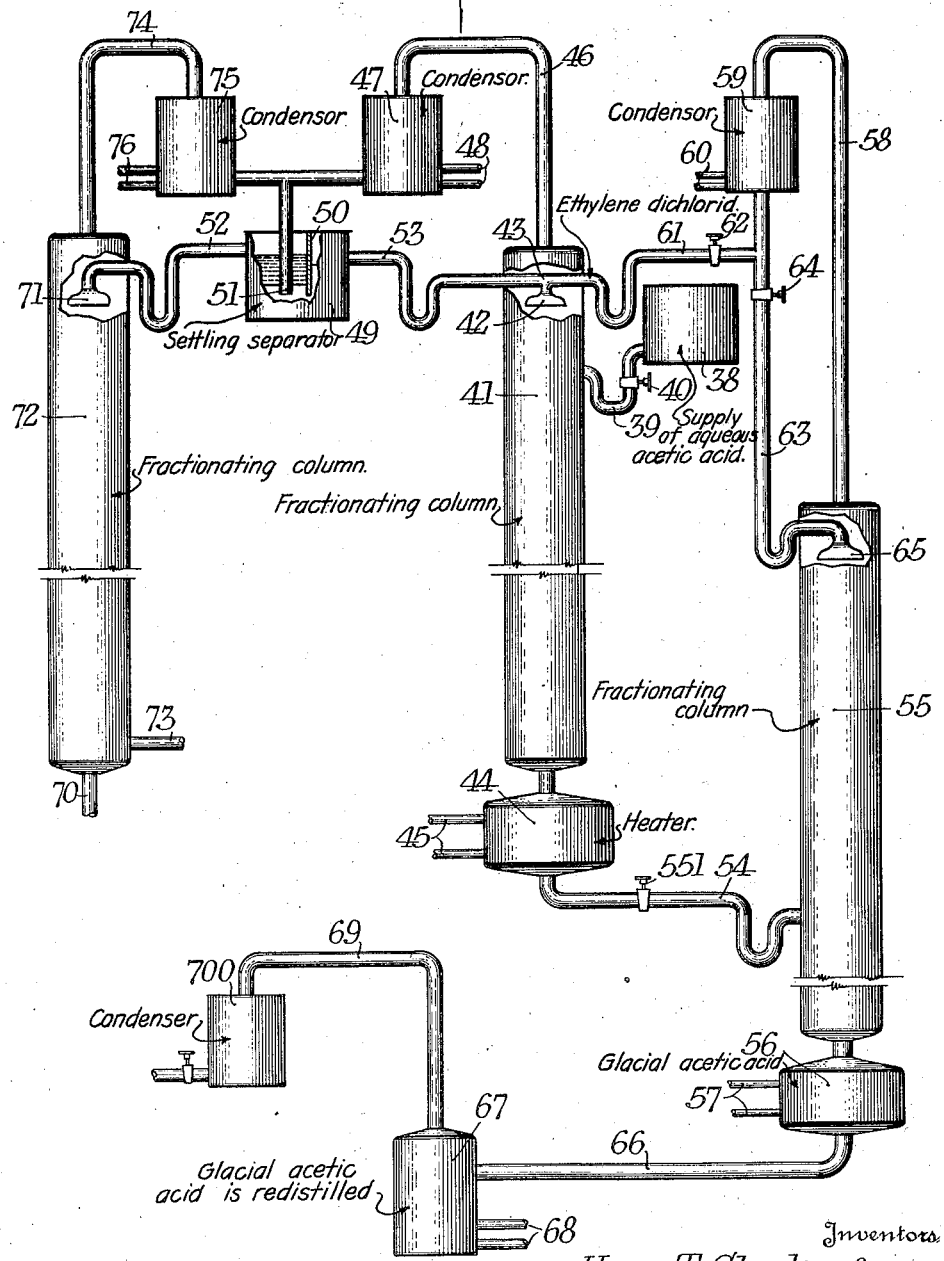

Inventors,
Hans T. Clarke &
Donald F. Othmer,
By R. L. Stinchfield
Attorney

Patented May 12, 1931

1,804,745

UNITED STATES PATENT OFFICE

HANS T. CLARKE AND DONALD F. OTHMER, OF ROCHESTER, NEW YORK, ASSIGNORS TO EASTMAN KODAK COMPANY, OF ROCHESTER, NEW YORK, A CORPORATION OF NEW YORK

PROCESS OF REMOVING WATER FROM AQUEOUS ACETIC ACID

Application filed November 12, 1927. Serial No. 232,916.

This invention relates to processes of removing water from aqueous acetic acid. One object of the invention is to provide a process that will be simple, inexpensive, and yet applicable to acid solutions of any strength, high or low. Another object is to provide a process which will be applicable not only to relatively pure water solutions of acetic acid, but also to the production of concentrated and glacial acetic acid from crude aqueous acetic acid, such as the pyroligneous liquor from wood distillation. A further object is to provide a process in which the water which is finally removed carries away only a very small or negligible amount of acetic acid with it. Still another object is to provide such a process in which the amount of heat required is kept as low as possible. A further object is to provide such a process in which distillation is the main factor without the trouble and cost of initial extraction steps. Another object is to provide a process in which distillation of the aqueous acid is carried out with the aid of an auxiliary organic liquid which combines the essential properties of such an auxiliary in a way not heretofore known. Other objects will hereinafter appear.

In the accompanying drawing,—

Fig. 1 is a diagrammatic side elevation of one form of apparatus in which the process may be carried out, the parts being relatively exaggerated for the sake of clearness;

Fig. 2 is a similar view of another apparatus in which the process may be carried out;

Fig. 3 is a similar view of the preferred apparatus for carrying out the process;

Figure 4:
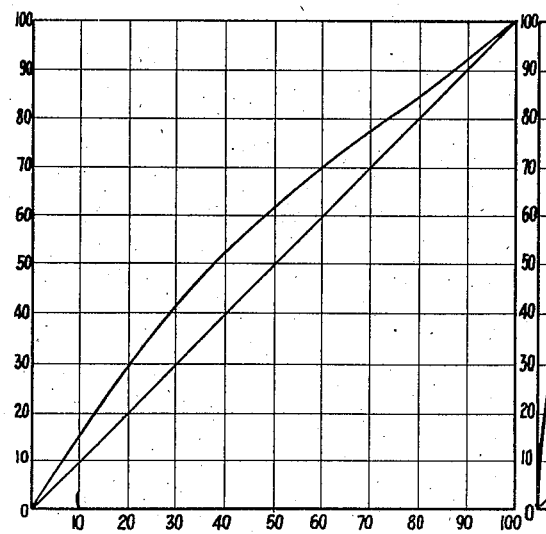
Figs. 4, 5, 6 and 7 are charts showing the water-removing possibilities when aqueous acetic acid of different concentrations is distilled alone and with different kinds of auxiliary liquids.

The removal of water wholly or partially from aqueous acetic acid is a problem of great technical importance. For example, certain chemical processes, such as the manufacture of cellulose acetate, use large quantities of glacial or anhydrous acetic acid, and often have left at the end of such manufacture large amounts of diluted acetic acid from which the water must be removed before it can be reemployed. To lessen the expense of such removal is highly desirable. Also acetic acid in the first stages of its production is too diluted with water for most manufacturing processes. For example, the largest present source of acetic acid is the destructive distillation of wood, which produces initially a dilute aqueous solution of acetic acid with other bodies called pyroligneous liquor. It is highly desirable to remove the water from this liquor (after separating out most of said other bodies) by a process which is simple and more inexpensive than those heretofore used. When acetic acid is made by action of micro-organisms, it is formed in dilute aqueous solutions which it is desirable to concentrate cheaply.

Our process of removing water is primarily a distillation one, in contradistinction to an extraction process. We have found that the hereinabove mentioned objects and desired results may be attained by mixing the aqueous acetic acid with ethylene dichlorid and distilling water and ethylene dichlorid from the mixture at a temperature below the boiling point of water,—usually more than 25° C. below said boiling point. Preferably extraction agents, especially high-boiling ones, are not present, because they are expensive, troublesome to recover and require too much heat. The process is preferably carried out in a fractionating column of known type, the distilled water and ethylene dichlorid being condensed, allowed to settle into two layers, and the ethylene dichlorid which forms the lower layer being returned to the upper part of the column. It is desirable to use more than nine times as much ethylene dichlorid (by weight) as the water to be removed. Furthermore, in the preferred embodiment of our process the ethylene dichlorid passes through a cycle without serious loss and can be used over and over. The bulk of it separates from the water by gravity in the distillate and this layer is reconducted to the still.

The chief requirements of an organic auxiliary liquid for use in distilling water from aqueous acetic acid are as follows:

1. It must not react with acetic acid, nor be decomposed, when boiled with the latter, into impurities which would contaminate the acid.

2. It must be available cheaply in large quantities.

3. It should boil at a lower temperature than acetic acid and thus be readily and completely separable from the latter by distillation.

4. It must form an azeotropic mixture with water vapor.

5. Its miscibility with water should be low.

6. It must cause the concentration of acetic acid in the watery layer of the distillate to be always lower than that of the aqueous acetic acid which is being concentrated,—such difference in the concentrations being as large as possible.

7. The latent heat of the solvent and the composition of its azeotropic mixture with water-vapor should be such that the amount of heat required for vaporizing a unit amount of water (in the azeotropic mixture) should be as low as possible.

8. The distribution ratio of acetic acid between water and said auxiliary liquid, or in other words, the ratio of acetic acid in the water to that in said liquid when the two liquids containing acetic acid are in contact (say in superimposed layers) should be low.

We have found that ethylene dichlorid is unique in the extent to which it meets all of these requirements. Prolonged boiling with such a powerful agent as acetic acid might have been expected to free hydrochloric acid or form chlorinated compounds that would contaminate the final acid, and render it unfit for many purposes, such as the manufacture of cellulose acetate for photographic films. But tests under conditions more severe than could occur in practice have shown that ethylene dichlorid has the necessary stability. It is now cheaply available in large quantities. Its boiling point at atmospheric pressure is approximately 83° C. (over 34° C. lower than that of acetic acid) and thus can be readily distilled from acetic acid. It forms an azeotropic mixture with water vapor, which boils under atmospheric pressure, at approximately 70.2° C. Water dissolves less than 1% of it by weight at 20° C.

When using a proper fractionating column there is substantially no acid (less than 0.5%) in the watery layer of the distillate. Since distillation will not concentrate aqueous acid weaker than the watery layer of the distillate and since our process in proper apparatus causes virtually no acid in such layer, said process can concentrate aqueous acetic acid of any strength,—from less than 1% to over 99%.

Heat economy with ethylene dichlorid is better than with any of the many auxiliary liquids which we have tested. Let L represent the latent heat of vaporization of ethylene dichlorid, P the number of parts by weight of the latter which distill over with one part of water in the azeotropic mixture, and $L_w$ the latent heat of vaporization of water. Then,—

$$\frac{L.P}{L_w} = R$$

The value R thus indicates the added amount of heat units required to vaporize in the presence of ethylene dichlorid, a quantity of water which, by itself, would be vaporized by a single heat unit. In the case of ethylene dichlorid R is only approximately 1.7. Consequently the heat expense in our process is very low.

An ethylene dichlorid layer in contact with a watery layer, in the distillate will take up a high proportion of the acetic acid present. Thus the distribution ratio of acid between water and the liquid is low.

Reference to Figs. 4, 5, 6 and 7 will show still further the superior suitability of ethylene dichlorid. In each figure the abscissæ are the percentages of water relative to the weight of acid in the liquid being distilled, and the ordinates are the percentage of water relative to the acid in the watery layer of the distillate. In other words, such percentage of water was first determined in the liquid to be distilled. The latter was then distilled long enough to get a test distillate. The latter was allowed to settle to form a watery layer and the percentage of water determined in this layer. In each figure there is, for convenience, a straight line at 45° which indicates equality in the percentages. Points above this line indicate that the water can be distilled off to concentrate the original liquid.

Figure 4 shows the conditions when a mixture of acetic acid and water alone is distilled. It will be seen that, no matter what the strength of the aqueous acid is, the percentage of water in the corresponding distillate is only slightly greater, the curve being only a little above the straight line. This shows one reason why it is uneconomical to distill the aqueous acid alone.

Figure 5:
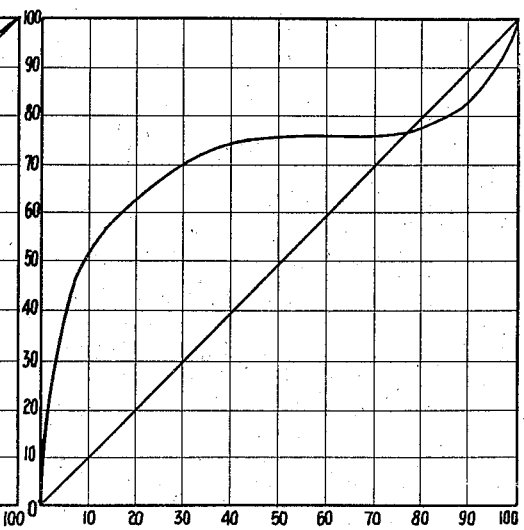
Figure 6:
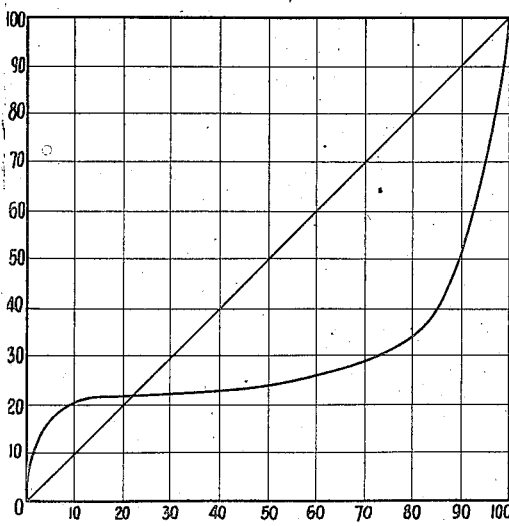

Figure 5 gives the curve for a mixture of acetic acid-water-benzene. The curve crosses the straight line, showing that benzene is useless for distilling off water from aqueous acetic acid containing over 78% water,—that is, acid weaker than 22%. This undesirable characteristic is found in practically all hydrocarbons. Figure 6 showing the curve for a mixture of acetic acid-water-and petroleum oil (boiling point of latter 78° to 80° C.). Such oil is useless for distilling off water from any aqueous acid weaker than 78% (more than 22% water).

Figure 7:
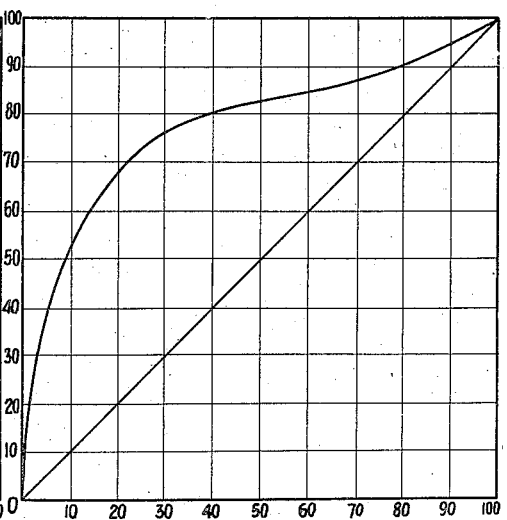

Figure 7, however, shows that ethylene dichlorid can be mixed in excess with aqueous acetic acid of any strength and enable the water to be rapidly distilled off. This curve is obtained by plain distillation. When a fractionating column is used, the acid in the watery layer of the distillate is negligible, often about 0.15% or less.

Referring to the accompanying drawing, Figure 1 shows diagrammatically one of the simplest ways in which our invention may be carried out. The dilute aqueous acetic acid enters by pipe 1 controlled by valve 2 into the acid heater 3, the latter being heated by a steam jacket or steam coil, in the conventional way, through pipes 4. The vapors from the heated dilute acid enter the fractionating column 5, which may be of any of the well known types and in this fractionating column meet a downward current or spray of ethylene dichlorid coming from the nozzle 6 fed through pipe 7 from supply 8, valve 9 controlling the flow. An azeotropic mixture of water vapor and ethylene dichlorid passes through the pipe 90 into condenser 10, cooled in any conventional way through pipes 11, and the liquid, thus formed, descends through pipe 12 into the settling vessel 13. Here the distillate separates, by gravity, into two layers, the lower one being ethylene dichlorid, which can be drawn off through pipe 14 controlled by valve 15. This ethylene dichlorid may then be reintroduced into supply 8. The upper layer is composed chiefly of water, but may contain small amounts of acetic acid and ethylene dichlorid. It may be drawn off through pipe 16, controlled by valve 17. If the amount of ethylene dichlorid in it is of any consequence, this may be recovered by a flashing and condensing process,—that is, one in which a current of steam is blown through the water and the ethylene dichlorid, thus evolved, is condensed. The liquid, which finally results in vessel 3, will be completely dehydrated. Since an excess of ethylene dichlorid is used, say over nine times the weight of the water to be removed, the liquid in vessel 3 will finally become a dehydrated mixture of ethylene dichlorid and glacial acetic acid. This can be withdrawn through pipe 300 controlled by valve 301 and the two ingredients separated by fractional distillation in any usual apparatus, this being easy because of the wide difference in the boiling points.

Figure 2 shows a further modification in which the major part of the ethylene dichlorid passes rapidly through a definite cycle. The dilute aqueous acetic acid enters through pipe 18 controlled by valve 19 into the heating vessel 20, the latter being supplied with the necessary heating fluids for its jacket or coils through pipes 21. The ascending vapors in fractionating column 22, of known type, meet a descending spray or stream of ethylene dichlorid coming from nozzle or opening 23. The azeotropic mixed vapors of water and ethylene dichlorid pass through pipe 24 into condenser 25, which receives its supply of cooling fluid through pipes 26. From the condenser it flows through pipe 27 into the settling vessel 28. The upper layer of water is withdrawn through pipe 29 controlled by valve 30, and the lower layer of ethylene dichlorid is conducted back to nozzle 23 from the settling vessel 28 through pipe 31, controlled by valve 32. Also, there is an auxiliary supply 35 of ethylene dichlorid from which the latter may be conducted to nozzle 23 through pipe 36 controlled by valve 37. This supply is merely to compensate for any losses which take place during the regular cycle of ethylene dichlorid through parts 24, 25, 27, 28, 31 and 23. The water, which is drawn off, can be thrown away, or any ethylene dichlorid flashed out and condensed, as explained above in connection with Figure 1. The dehyrated mixture of ethylene dichlorid and glacial acetic acid is drawn off from heater 20 through pipe 200, controlled by valve 201 and then fractionated to separate the ingredients, as will be obvious.

Figure 3 shows diagrammatically the preferred apparatus for carrying out our invention. The supply tank of aqueous acetic acid 38 is connected by pipe 39, controlled by valve 40 with an intermediate portion (say about two-thirds of the way up) of a fractionating column 41 of one of the usual types. At the top of this column a downward current or spray of ethylene dichlorid enters from nozzle or opening 42, which is connected with the horizontal transverse pipe 43. The base of the column is provided with the customary heating vessel 44, the heating fluid for which comes through pipes 45. The azeotropic mixture of the vapors of water and ethylene dichlorid leaves the top of the column passing around pipe 43 into pipe 46 and from thence enters condenser 47, the cooling fluid of which circulates through pipes 48. The distillate from 47 flows down into settling chamber 49, the latter being provided with a downwardly extending transverse partition 50, which is separated, however, from the bottom of the vessel. The pipe 51 from the condenser 47 likewise extends well down into the vessel 49. When the distillate reaches vessel 49, it separates into two layers, the water layer being uppermost and confined at one side of the partition 50, as shown in the drawing. From the vessel 49 the watery layer passes through exit pipe 52 to further treating apparatus which will be described hereinafter. The lower layer of ethylene dichlorid passes beneath the partition 50 and out through pipe 53 to pipe 43 and thence downwardly through the nozzle 42 into the fractionating column 41. Thus the bulk of the ethylene dichlorid passes through a cycle from nozzle 42 to column 41 and thence through the following parts,—46, 47, 51, 49, 53 and 43.

But there is an excess of ethylene dichlorid used,—namely, more than nine parts by weight of ethylene dichlorid for each part by weight of water to be eliminated. This means that some ethylene dichlorid will collect with the dehydrated or glacial acetic acid in the heating vessel 44. This dehydrated mixture is then conducted through pipe 54 controlled by valve 551 to an intermediate portion of an auxiliary fractionating column 55 of one of the known types. The heating for this column 55 is done in the chamber 56, the heating fluid for which circulates through pipes 57. Vapors of ethylene dichlorid pass from the top of the column through pipe 58 to condenser 59, the cooling fluid of which circulates through pipes 60. This condensed ethylene dichlorid can be passed partly through pipe 61 controlled by valve 62 into pipe 43 and nozzle 42 of the main fractionating column, and partly through pipe 63 controlled by valve 64 into the nozzle or opening 65 at the top of column 55, there to act as refluxing liquid.

The glacial acetic acid in vessel 56 is conducted through pipe 66 to a simple still 67, the heating fluid for which circulates through pipes 68. The vapors of acetic acid pass over through pipe 69 into the final condenser 700 from which the glacial acetic acid can be drawn off and stored. The distillation in still 67 is not indispensable, but is preferable to remove some small amounts of coloring or polymerized bodies that may be formed during the other operations.

Referring to the upper left-hand part of Figure 3, the watery layer from the settling vessel 49 passes through pipe 52 to the nozzle or opening 71 at the top of fractionating column 72, the latter being of any of the usual types. Steam is blown into the column through pipe 73 and hot water passes to waste through pipe 70, preferably to a heat interchanger, not shown. The passage of the steam up the column 72 flashes off the small amount of ethylene dichlorid which is present in the watery material descending from nozzle 71. The vapors of ethylene dichlorid pass through pipe 74 into condenser 75, the cooling fluid of which circulates through pipes 76. The ethylene dichlorid from 75 passes through pipe 51 to the bottom or lower layer of the settling vessel 49 and thence returns through the normal circulatory path of the ethylene dichlorid through pipes 53 and 43 and nozzle 42.

It will be understood that in all forms of apparatus the customary precautions for preventing heat losses by suitable insulation are observed, and the parts which contact with the acid are made of resistant materials customarily employed for that purpose. Furthermore, the process is preferably operated under atmospheric pressure conditions, although it can be conducted with the system at superatmospheric pressure or subatmospheric. When we refer herein to the boiling points of the ingredients and mixtures such, for instance, as the boiling point of water, we refer to those under the particular pressure conditions that are employed,—normally atmospheric. It will be noted that ethylene dichlorid is a symmetrical saturated compound, whereas symmetrical dichlorethylene is an unsaturated compound. Our invention is concerned with the former.

Having thus described our invention, what we claim as new and desire to secure by Letters Patent is:

1. In the process of removing water from aqueous acetic acid the steps of mixing therewith ethylene dichlorid and distilling water and ethylene dichlorid from the mixture at a temperature below the boiling point of water said process being free from steps of dehydration with deliquescent inorganic salts.

2. In the process of removing water from aqueous acetic acid the steps of mixing therewith at least nine parts by weight of ethylene dichlorid for each part of water to be removed, and distilling water and ethylene dichlorid from said mixture, the latter being substantially free from solvents of acetic acid that have a higher boiling point than said acid.

3. In the process of removing water from aqueous acetic acid the steps of mixing therewith more than nine parts by weight of ethylene dichlorid for each part of water to be removed, distilling off the water with part of the ethylene dichlorid, and separating the dehydrated acetic acid from the remaining ethylene dichlorid, said distillation being conducted at a temperature below the boiling point of water.

4. In the process of removing water from aqueous acetic acid the steps of mixing therewith ethylene dichlorid, distilling the mixture at a temperature below the boiling point of water to evolve a constant boiling mixture of water and ethylene dichlorid, condensing the latter mixture, allowing it to settle into two layers, and returning the lower layer to the original mixture undergoing distillation.

5. In the process of removing water from aqueous acetic acid, the steps of supplying said acid to a distilling column, during distillation therein adding ethylene dichlorid at the upper part of the column, and removing from the top of the column a constant boiling mixture of water and ethylene dichlorid at a temperature below the boiling point of water.

6. In the process of removing water from aqueous acetic acid, the steps of supplying said acid to a distilling column, during distillation therein adding ethylene dichlorid at the upper part of said column, and removing from the top of the column a constant boiling mixture of water and ethylene dichlorid at a temperature below the boiling point of water, the weight of ethylene dichlorid added to said column being at least nine times the weight of the water to be removed.

7. In the process of removing water from aqueous acetic acid, the steps of supplying said acid to an intermediate part of a distilling column, during distillation therein adding ethylene dichlorid at the upper part of said column, removing from the top of the column a constant boiling mixture of water and ethylene dichlorid, condensing the latter mixture and whatever acid comes over with it, allowing it to settle in two layers, returning the lower layer to the upper part of the column and withdrawing a mixture of dehydrated acetic acid and ethylene dichlorid from the lower part of the column, and separating the former from the latter, the total weight of ethylene dichlorid added to the upper part of the column per unit time being more than nine times the weight of water distilled from the top of the column per unit time, and the temperature at which said constant boiling mixture is removed being below 75° C.

8. In the process of dehydrating aqueous acetic acid the step of mixing ethylene dichloride with the aqueous acetic acid and distilling water and ethylene dichloride from the mixture.

9. In the process of dehydrating aqueous acetic acid, the step of supplying aqueous acetic acid to a distilling column, during distillation therein adding ethylene dichloride at the upper part of the column and removing from the top of the column a constant boiling mixture of water and ethylene dichloride.

10. In the process of dehydrating aqueous acetic acid, the step of mixing ethylene dichloride with the aqueous acetic acid, distilling water and ethylene dichloride from the mixture, condensing the distillate, allowing it to settle into two layers, and returning the lower layer to the original mixture undergoing distillation.

11. In the process of dehydrating aqueous acetic acid, the step of mixing ethylene dichloride with the aqueous acetic acid, distilling water and ethylene dichloride from the mixture, condensing the distillate, allowing it to settle into two layers, returning the lower layer to the original mixture undergoing distillation, and separating the dehydrated acetic acid from the remaining ethylene dichloride.

12. In the process of dehydrating aqueous acetic acid, the step of supplying aqueous acetic acid to a distilling column having fractionating plates therein, during distillation therein adding ethylene dichloride to the upper plate of the column in an amount in excess of that necessary to form with the water present a constant boiling mixture of water and ethylene dichloride and removing from the top of the column in vaporous form a constant boiling mixture of water and ethylene dichloride.

Signed at Rochester, New York, this 5th day of November, 1927.

HANS T. CLARKE.

Signed at Kingsport, Tenn.

DONALD F. OTHMER.